US010422150B2

(12) United States Patent
Roy

(10) Patent No.: US 10,422,150 B2
(45) Date of Patent: Sep. 24, 2019

(54) ALIGNMENT PLATE FOR MOUNTING A STRUCTURE TO A FOUNDATION

(71) Applicant: CommScope Technologies LLC, Hickory, NC (US)

(72) Inventor: Dino R. Roy, Saginaw, TX (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/904,896

(22) Filed: Feb. 26, 2018

(65) Prior Publication Data

US 2018/0251996 A1    Sep. 6, 2018

Related U.S. Application Data

(60) Provisional application No. 62/467,624, filed on Mar. 6, 2017, provisional application No. 62/470,408, filed on Mar. 13, 2017.

(51) Int. Cl.
*E02D 27/42* (2006.01)
*E04H 12/22* (2006.01)
*F16M 13/02* (2006.01)
*E04H 12/10* (2006.01)
*E04H 12/00* (2006.01)

(52) U.S. Cl.
CPC ......... *E04H 12/2284* (2013.01); *E02D 27/42* (2013.01); *E04H 12/2261* (2013.01); *F16M 13/022* (2013.01); *E04H 12/10* (2013.01); *E04H 2012/006* (2013.01)

(58) Field of Classification Search
CPC ........... E04G 21/185; E04B 2001/2684; E04H 12/2284; E04H 12/2261
See application file for complete search history.

(56) References Cited

U.S. PATENT DOCUMENTS

| 4,862,992 A * | 9/1989 | Melfi | E01F 8/0023 181/210 |
|---|---|---|---|
| 8,240,097 B2 * | 8/2012 | Day | E02D 19/00 248/346.5 |
| 2005/0285011 A1 * | 12/2005 | Harwood | E04H 12/2261 248/519 |
| 2007/0158526 A1 * | 7/2007 | Platt | E04H 12/2261 248/519 |
| 2008/0184633 A1 * | 8/2008 | Hamilton | E04H 12/2284 52/127.12 |

(Continued)

FOREIGN PATENT DOCUMENTS

| GB | 2417500 A | 3/2006 |
| WO | 2016/200268 A1 | 12/2016 |

OTHER PUBLICATIONS

Combined Search and Examination Report corresponding to Application No. GB1803533.7 dated Jul. 27, 2018.

*Primary Examiner* — Gisele D Ford

(74) *Attorney, Agent, or Firm* — Myers Bigel, P.A.

(57) ABSTRACT

An alignment plate for mounting of a structure to a foundation includes: a generally planar main body having a center, a length direction and a width direction that is perpendicular to the length direction; and a plurality of first mounting slots in the main body and a plurality of second mounting slots in the main body, wherein the first mounting slots extend in the length direction and the second mounting slots extend in the width direction.

10 Claims, 5 Drawing Sheets

(56) References Cited

U.S. PATENT DOCUMENTS

| | | | |
|---|---|---|---|
| 2011/0222957 A1* | 9/2011 | Marques Lito Velez Grilo | E02D 27/42 403/4 |
| 2013/0048825 A1* | 2/2013 | Stalemark | B23B 47/28 248/534 |
| 2014/0305067 A1* | 10/2014 | Ventling | E04G 21/14 52/688 |
| 2015/0259913 A1* | 9/2015 | Tanaka | E04C 3/32 52/296 |
| 2017/0247899 A1* | 8/2017 | Faries | E04H 12/223 |

* cited by examiner (12)

ALIGNMENT PLATE FOR MOUNTING A STRUCTURE TO A FOUNDATION

RELATED APPLICATIONS

The present invention claims priority from and the benefit of U.S. Provisional Patent Application Nos. 62/467,624, filed Mar. 6, 2017, and 62/470,408, filed Mar. 13, 2017, the disclosure of each of which is hereby incorporated herein.

FIELD OF THE INVENTION

The present invention relates generally to the mounting of structures, and more particularly to the alignment of mounted structures to foundation elements already present in the ground.

BACKGROUND

Because of the number of cellular phones and other communication devices currently used, the need for more, stronger and even taller, communication towers has become prevalent throughout the country. As a result, long, slender communication towers are appearing nationwide. Typically, these towers are tall lattice-steel structures, which start out with a large diameter base and taper down to a thinner cross-section. The towers are usually bedecked with a number of antennas, remote radio units (RRUs), and other types of communication hardware. Each such tower can be designed to hold a number of such devices, depending on its structural abilities.

Lattice-style communication towers typically have three or four legs that reach from the ground to the top of the tower. An exemplary communication tower 10 is shown in FIG. 1. The legs 12 are mounted in footings or anchors (often embedded in cement or concrete) that provide a solid foundation for the tower. The anchors are typically set first, which can create issues in aligning the tower legs to the anchors during construction.

SUMMARY

As a first aspect embodiments of the invention are directed to an alignment plate for mounting of a structure to a foundation, comprising: a generally planar main body having a center, a length direction and a width direction that is perpendicular to the length direction; and a plurality of first mounting slots in the main body and a plurality of second mounting slots in the main body, wherein the first mounting slots extend in the length direction and the second mounting slots extend in the width direction.

As a second aspect, embodiments of the invention are directed to an adjustable mounting assembly, comprising: a foundation; an alignment plate mounted to the foundation; and a structure mounted to the alignment plate. The alignment plate comprises a generally planar main body having a center, a length direction and a width direction that is perpendicular to the length direction. The mounting plate also includes a plurality of first mounting slots in the main body and a plurality of second mounting slots in the main body, wherein the first mounting slots extend in the length direction and the second mounting slots extend in the width direction. The foundation is mounted to the alignment plate via first rods inserted through the first mounting slots, and the structure is mounted to the alignment plate via second rods inserted through the second mounting slots, such that the position of the structure relative to the foundation is adjustable in a plane parallel with the main body of the alignment plate.

BRIEF DESCRIPTION OF THE FIGURES

Figure 1:
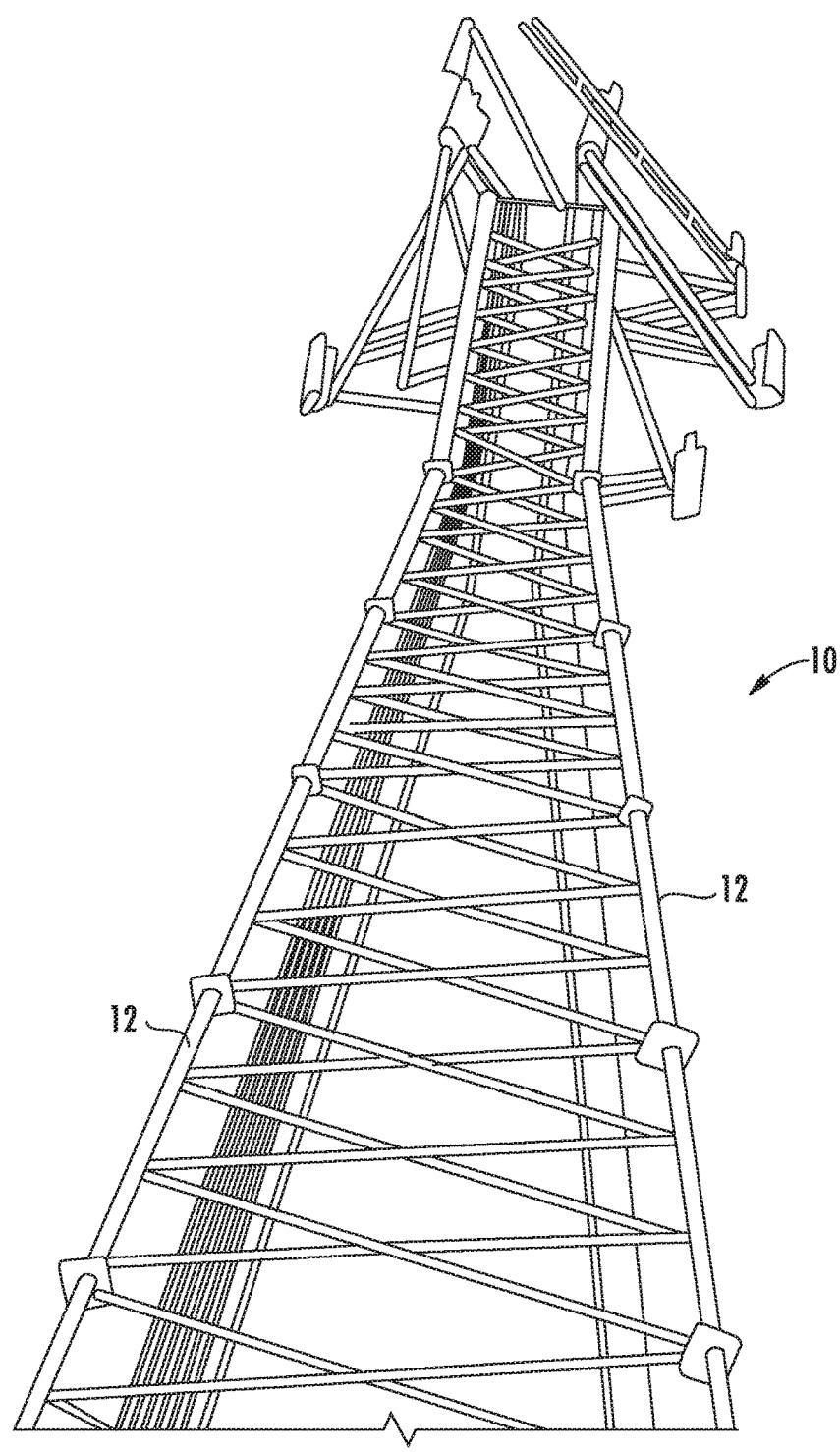
FIG. 1 is a perspective view of a conventional communication tower.

The present invention is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 2:
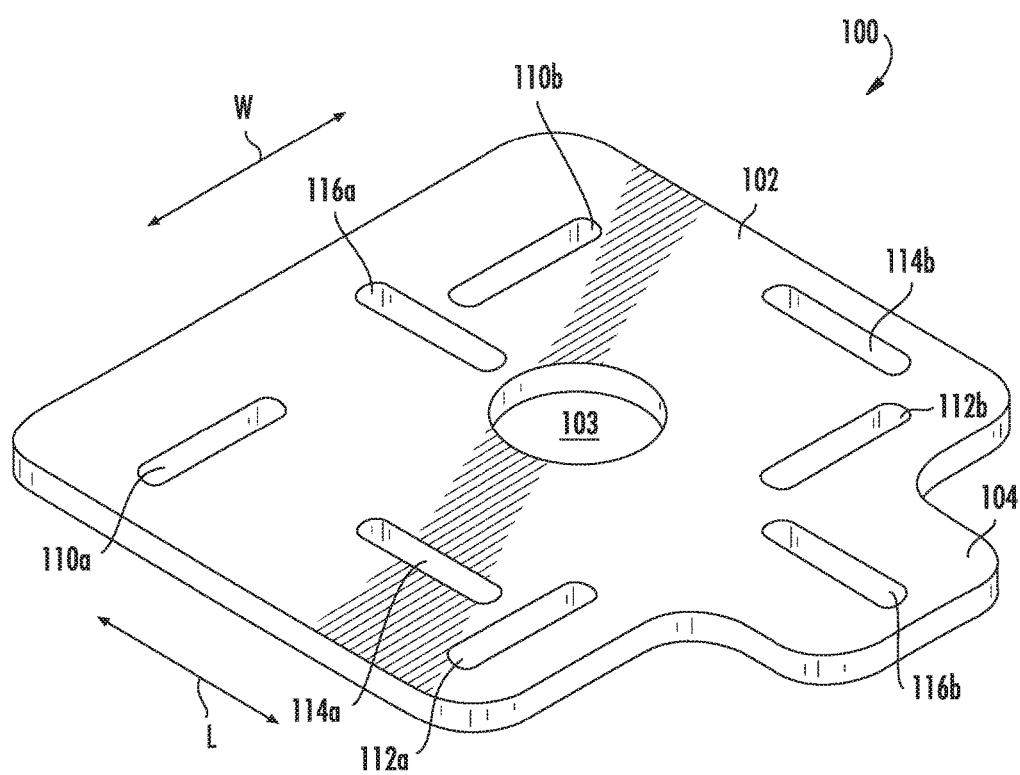
FIG. 2 is a perspective view of an alignment plate according to embodiments of the invention.

Referring now to the drawings, an alignment plate according to embodiments of the invention, designated broadly at 100, is shown in FIG. 2. The alignment plate 100 generally planar and has a main body 102 with a central hole 103 and a flange 104. For clarity purposes, the direction in which the flange 104 extends is the "length" direction of the alignment plate 100 (designated L) and the direction within the plane of the main body 102 perpendicular to the length direction is the "width" direction (designated W). The flange 104 extends from the "forward" end of the main body 102.

There are eight slots in the main body 102. Slots 110a, 110b extend in the width direction and are aligned with each other along the width direction on the rear portion of the main body 102. The slot 110a is located nearer its adjacent widthwise edge of the main body 102 than is the slot 110b. Slots 112a, 112b also extend and are aligned with each other in the width direction. The ends of the slots 112a, 112b are also aligned in the lengthwise direction with the ends of the slots 110a, 110b. Two slots 114a, 114b extend in the length direction. The slot 114a is located between the slots 110a, 112a and positioned with one end near the slot 112a. The ends of the slot 114b are aligned in the width direction with the slot 114a; the slot 114b is located nearer its adjacent widthwise edge of the main body 102 than is the slots 114a. A slot 116a extends lengthwise and is located between the slots 110a, 110b, but nearer the slot 110b. Finally, a slot 116b is located mostly in the flange 104 of the main body 102 and extends in the length direction in alignment with the slot 116a.

The alignment plate 100 can be formed of any structurally sound material, but is typically formed of steel. The alignment plate 100 may be of any size; however, to give a typical sense of proportion, for the mounting of a conventional communication tower leg, the alignment plate 100 may be between about 18 and 30 inches in width and length, with each slot measuring between about 5 and 8 inches in length and 0.5 to 1.5 inches in width. Typically the alignment plate 100 is between about 0.5 and 1.5 inches in thickness.

Figure 3:
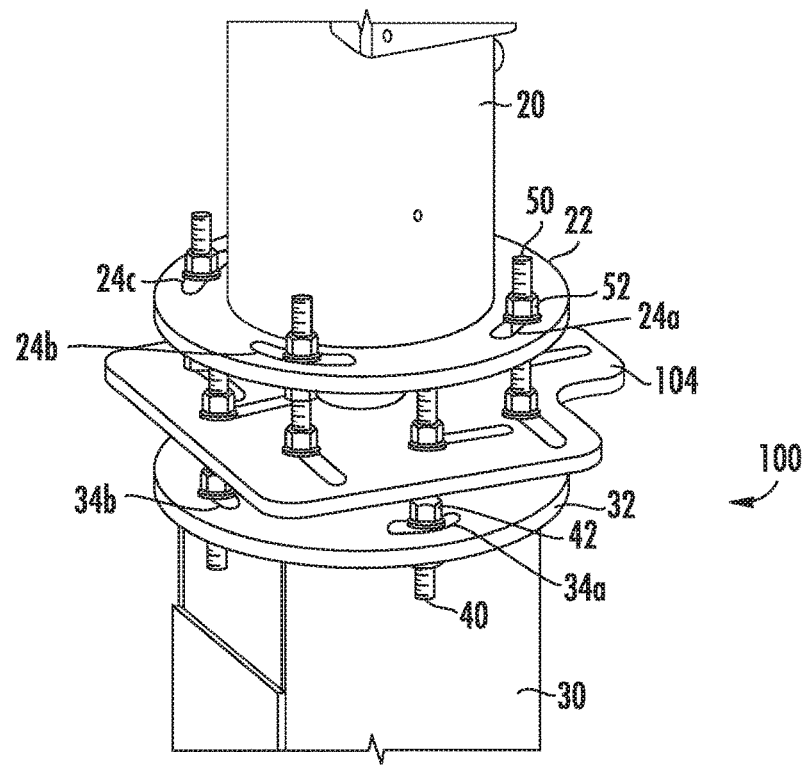
FIG. 3 is a perspective view of the alignment plate of FIG. 2 used to align an communication tower leg with a foundation anchor, wherein the communication tower leg is generally centered over the anchor.
Figure 4:
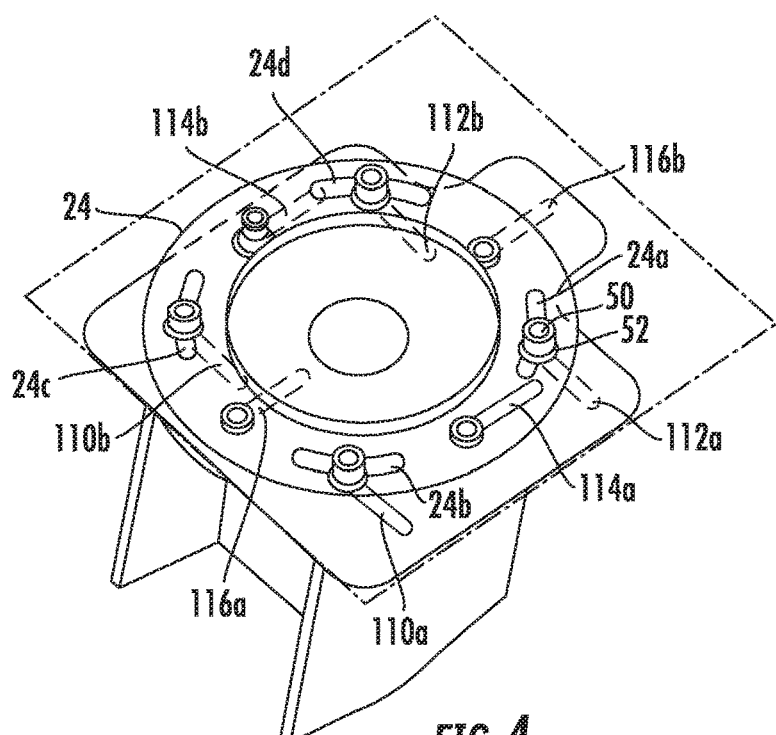
FIG. 4 is a top perspective view of the alignment plate, communication tower leg and anchor of FIG. 3.

As can be seen in FIGS. 3 and 4, the alignment plate 100 can be used to mount an communication tower leg 20 or the like to a foundation anchor 30. The foundation anchor 30 includes a round rim 32 with four slots 34a-34d (only slots 34a and 34b are visible herein) located approximately circumferentially equidistant from each other. The communication tower leg 20 also includes a round rim 22 with four slots 24a-24d (shown in FIG. 4) located approximately equidistant from each other.

Mounting of the alignment plate 100 to the anchor 30 is achieved via four threaded rods 40, each of which has four nuts 42 threaded thereon. One threaded rod 40 is inserted into each of the slots 34a-34d and into a respective slot 114a, 114b, 116a, 116b that extends in the length direction. The nuts 42 are tightened above and below the rim 32 of the anchor 30 and above and below the alignment plate 100.

In a similar manner, the communication tower leg 20 can be mounted to the alignment plate 100 via four threaded rods 50 and nuts 52. One threaded rod 50 is inserted into each slot 24a-24d and into a respective slot 110a, 110b, 112a, 112b that extends in the width direction. The nuts 52 are tightened above and below the alignment plate 100 and the rim 22 of the communication tower leg 20.

Figure 5:
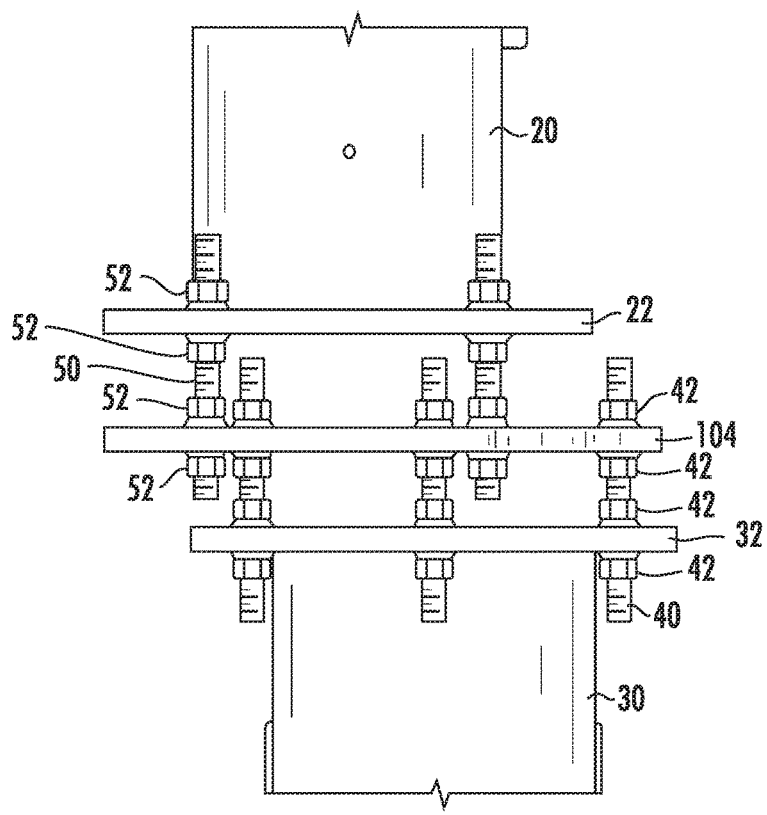
FIG. 5 is a side view of the anchor, alignment plate and communication tower leg of FIG. 3 shown with the communication tower leg in a position to the rear of center.
Figure 6:
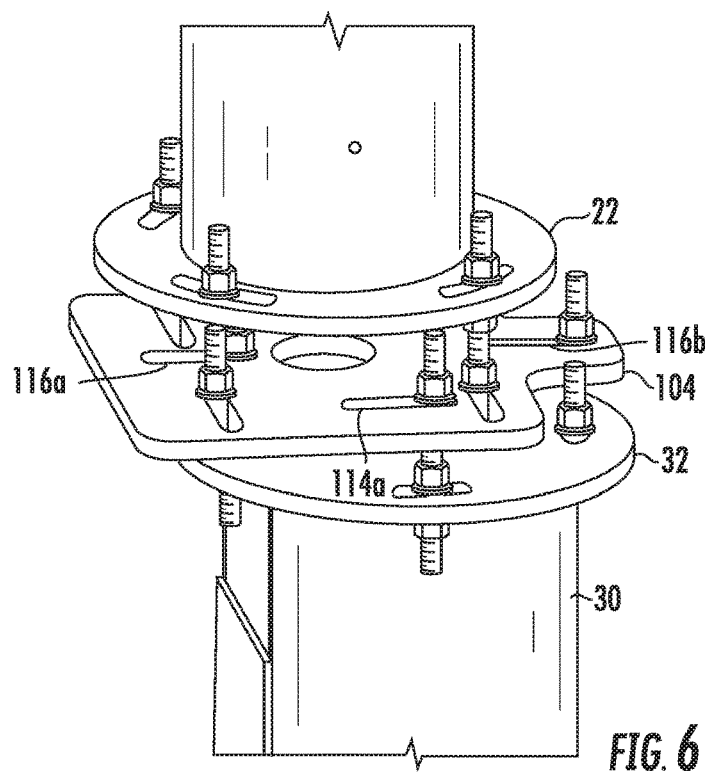
FIG. 6 is a perspective view of the alignment plate, communication tower leg and anchor in a rearward position as in FIG. 5.

The lengthwise orientation of the slots 114a, 114a, 116a, 116b enables the position of the alignment plate 100 to be adjusted in the length direction. More specifically, in the illustrated embodiment, the alignment plate 100 is "centered" or "neutral" relative to the anchor 30 when the threaded rods 40 are located at the rear ends of the slots 114a, 114b, 116a, 116b (see FIGS. 3 and 4). Adjusting the alignment plate 100 rearwardly relative to the anchor 30 (such that the threaded rods 40 are positioned more forwardly in the slots 114a, 114b, 116a, 116b) shifts the mounting locations for the communication tower leg 28 rearwardly (see FIGS. 5 and 6).

Figure 7:
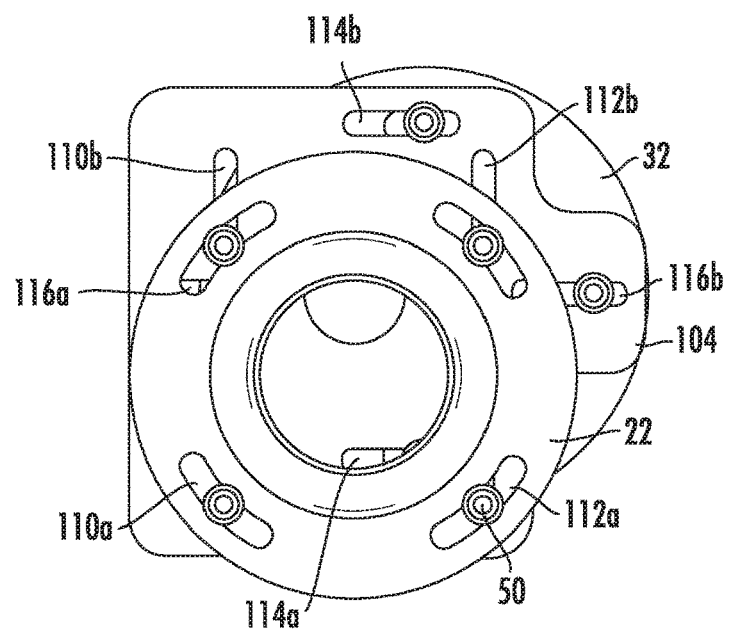
FIG. 7 is a top view of the communication tower leg, alignment plate and anchor of FIG. 3 shown with the communication tower leg shifted to the rear and to the right of center.
Figure 8:
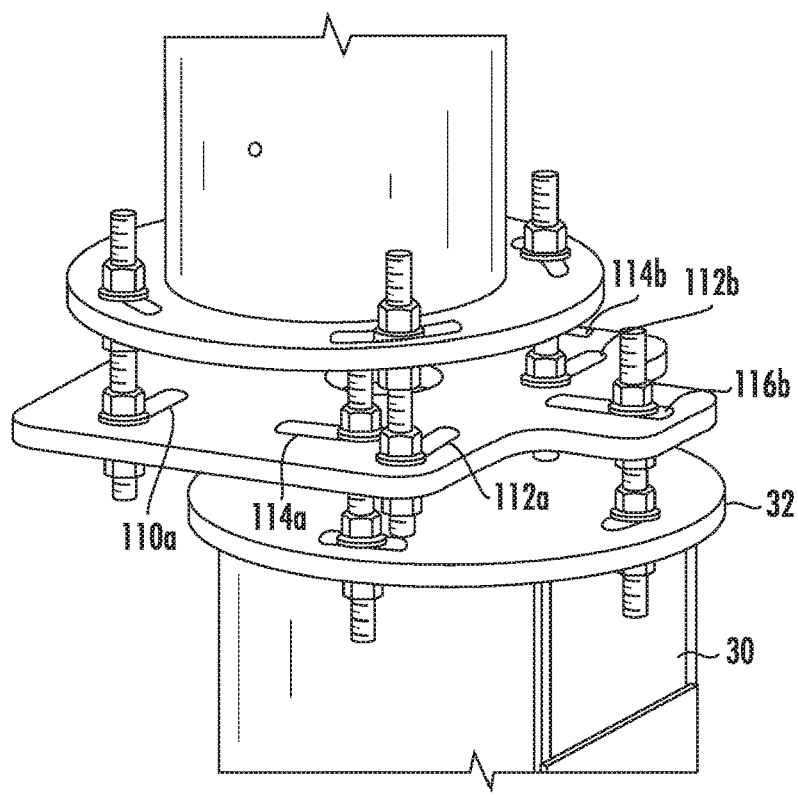
FIG. 8 is a perspective view of the communication tower leg, alignment plate and anchor shifted rearwardly and to the right as shown in FIG. 7.

Similarly, the widthwise orientation of the slots 110a, 110b, 112a, 112b enables the mounting position of the communication tower leg 20 to be varied in the width direction. More specifically, in the illustrated embodiment, the alignment plate 100 is "centered" or "neutral" relative to the anchor 30 when the threaded rods 40 are located at the "left" ends of the slots 110a, 110b, 112a, 112b from the perspective of FIGS. 3-8. Adjusting the communication tower leg 20 to the right relative to the alignment plate 100 (such that the threaded rods 40 are positioned more to the right in the slots 114a, 114b, 116a, 116b) shifts the mounting locations for the communication tower leg 20 to the right also (see FIGS. 7 and 8).

Those of skill in this art will recognize that the alignment plate 100 can be re-oriented to provide different mounting locations in the opposite directions. To provide mounting locations that are forward of the anchor 30, the alignment plate 100 is oriented so that the flange 104 extends in the opposite direction from that shown in FIGS. 3-8. In this orientation, the slots 114a, 114b, 116a, 116b are positioned relative to the anchor 30 to provide forward mounting locations. To provide mounting locations that are to the left of the anchor 30, the alignment plate 30 can be inverted from its position shown in FIGS. 3-8. In this orientation, the alignment plate 30 can provide mounting locations that are shifted to the left of center (i.e., opposite of that shown in FIGS. 7 and 8).

The ability of the alignment plate 100 to be re-oriented as described above enables a single alignment plate configuration to adjust for the mounting of an communication tower leg 20 in any direction (i.e., forward, rearward, let, right, or a combination of these). In the illustrated embodiment, the mounted position of the communication tower leg 20 may be adjusted as much as 6 to 7 inches from a center position.

Those of skill in this art will appreciate that the alignment plate 100 can take other forms. More or fewer slots may be included. The slots may be longer or shorter, wider or narrower, or may be re-arranged on the main body 102. The alignment plate 100 may be rectangular or square, (i.e., it may lack the flange 104), or may take another shape, such as circular, hexagonal, triangular, oval, or the like. Other variations will be apparent to those of skill in this art.

In addition, those skilled in this art will appreciate that the alignment plate 100 may be employed to mount other structures to other foundations. Examples of structures to be mounted include three- and four-legged communication towers, monopoles and integrated platforms for telecommunications cabinets. The foundation may be any element, such as the aforementioned anchor or footing, that is fixed in place prior to mounting of the structure to be mounted.

Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

That which is claimed is:

1. An alignment plate for mounting of a structure to a foundation, comprising:
   a generally planar main body having a center, a length direction and a width direction that is perpendicular to the length direction;
   a plurality of first mounting slots in the main body and a plurality of second mounting slots in the main body, wherein the first mounting slots extend in the length direction and the second mounting slots extend in the width direction; and
   a plurality of first rods inserted through the first mounting slots and a plurality of second rods inserted through the second mounting slots,
   wherein the first mounting slots enable a position of the alignment plate to be adjusted in the length direction and the second mounting slots enable the position of the alignment plate to be adjusted in the width direction,
   wherein two of the first mounting slots define a first pair aligned along the length direction,
   wherein two of the second mounting slots define a second pair aligned along the width direction, and
   wherein two of the second mounting slots define a third pair aligned along the width direction.

2. The alignment plate defined in claim 1, wherein one of the first pair of first mounting slots is located nearer to the center of the main body than the other of the first pair of first mounting slots.

3. The alignment plate defined in claim 1, wherein one of the second pair of second mounting slots is located nearer to the center of the main body than the other of the second pair of second mounting slots.

4. The alignment plate defined in claim 1, wherein one of the third pair of second mounting slots is located nearer to the center of the main body than the other of the third pair of second mounting slots.

5. The alignment plate defined in claim 4, wherein ends of the second pair of second mounting slots are aligned with ends of the third pair of second mounting slots in the length direction.

6. The alignment plate defined in claim 5, wherein the second pair of second mounting slots is nearer the center of the main body than the third pair of second mounting slots.

7. The alignment plate defined in claim 5, wherein two of the first mounting slots define a first pair aligned along the length direction.

8. The alignment plate defined in claim 6, wherein a first pair of first mounting slots is located nearer to the center of the main body than the other of the first pair of first mounting slots.

9. The alignment plate defined in claim 8, wherein two of the first mounting slots define a second pair of first mounting slots, wherein ends of the second pair of first mounting slots are aligned in the width direction.

10. An alignment plate for mounting of a structure to a foundation, comprising:
    a generally planar main body having a center, a length direction and a width direction that is perpendicular to the length direction; and
    a plurality of first mounting slots in the main body and a plurality of second mounting slots in the main body, wherein the first mounting slots extend in the length direction and the second mounting slots extend in the width direction,
    wherein two of the second mounting slots define a first pair of second mounting slots aligned along the width direction,
    wherein one of the first pair of second mounting slots is located nearer to the center of the main body than the other of the first pair of second mounting slots,
    wherein two of the second mounting slots define a second pair of second mounting slots aligned along the width direction,
    wherein one of the second pair of second mounting slots is located nearer to the center of the main body than the other of the second pair of second mounting slots,
    wherein ends of the first pair of second mounting slots are aligned with ends of the second pair of second mounting slots in the length direction,
    wherein the first pair of second mounting slots is nearer the center of the main body than the second pair of second mounting slots,
    wherein one of a first pair of first mounting slots is located nearer to the center of the main body than the other of the first pair of first mounting slots,
    wherein two of the first mounting slots define a second pair of first mounting slots, wherein ends of the second pair of first mounting slots are aligned in the width direction, and
    wherein the second pair of first mounting slots are nearer to the third pair of second mounting slots than to the second pair of second mounting slots.

\* \* \* \* \*